United States Patent [19]

Owada et al.

[11] Patent Number: 5,023,715
[45] Date of Patent: Jun. 11, 1991

[54] METHOD OF AND APPARATUS FOR TRANSMITTING IMAGE INFORMATION

[75] Inventors: Mitsuru Owada, Yokohama; Yoshiki Ishii, Hadano, both of Japan

[73] Assignee: Canon Kabushiki Kaisha, Tokyo, Japan

[21] Appl. No.: 520,857

[22] Filed: May 8, 1990

Related U.S. Application Data

[63] Continuation of Ser. No. 272,418, Nov. 17, 1988, abandoned.

[30] Foreign Application Priority Data

Dec. 1, 1987 [JP] Japan ............................. 62-301554

[51] Int. Cl.$^5$ .......................... H04N 7/18; H04N 7/12
[52] U.S. Cl. ................................... 358/133; 358/105; 358/135
[58] Field of Search ............... 358/105, 260, 133, 135, 358/136, 426, 476

[56] References Cited

U.S. PATENT DOCUMENTS

| | | | |
|---|---|---|---|
| 4,710,811 | 12/1987 | Kondo | 358/135 |
| 4,729,021 | 3/1988 | Kondo | 358/105 |
| 4,788,598 | 11/1988 | Ochi et al. | 358/260 |
| 4,802,005 | 1/1989 | Kondo | 358/136 |
| 4,807,042 | 2/1989 | Tanaka | 358/260 |
| 4,823,194 | 4/1989 | Mishima et al. | 358/93 |

Primary Examiner—John K. Peng
Attorney, Agent, or Firm—Fitzpatrick, Cella, Harper & Scinto

[57] ABSTRACT

An image information transmission method divides a frame of image data into a plurality of blocks each having a unit block constituted by a predetermined number of picture element (pixel) data. A plurality of distinguishable distribution data representing the distribution of levels of this pixel data are formed for each block from the pixel data. Position data representing the levels of the pixel data in terms of position in the distribution are also formed. A unit data block is formed for each block from the distribution and position data. The unit data blocks corresponding to successive blocks are serially transmitted in predetermined order, and the sequence of transmission of distribution data in each unit data block is changed in accordance with predetermined information. This predetermined information is stored in accordance with the transmission sequence of the distribution data and the pixel data of the unit picture element block thus transmitted are restored using the distribution data and the plurality of position data in the transmitted unit data block.

24 Claims, 6 Drawing Sheets

ALL PICTURE ELEMENT DATA

FIG. 3
PRIOR ART

SMALL BLOCK DATA

METHOD OF AND APPARATUS FOR TRANSMITTING IMAGE INFORMATION

This application is a continuation of application Ser. No. 272.418, filed Nov. 17, 1988 now abandoned.

BACKGROUND OF THE INVENTION

1. Field of the Invention

The present invention relates to a method of and an apparatus for transmitting image information and, more particularly, to improved image information transmission method and apparatus which provide a high level of coding efficiency.

2. Description of the Prior Art:

Hitherto, a high-efficiency television signal coding method has been known as a method for transmitting image information. In order to restrict the transmission band, this method makes use of a so-called MAX-MIN method which relies upon minimization of the average number of picture elements as will be understood from the following description.

In general, television signal has a very close time/space correlation. When an image is divided into minute blocks, the dynamic range of each block is often restricted by a local correlation. It is therefore possible to compress information in a very efficient manner by determining the dynamic range for each block and coding the information of each block in an adaptive manner.

The coding operation will be described with reference to FIGS. 1 to 6.

Figure 1:
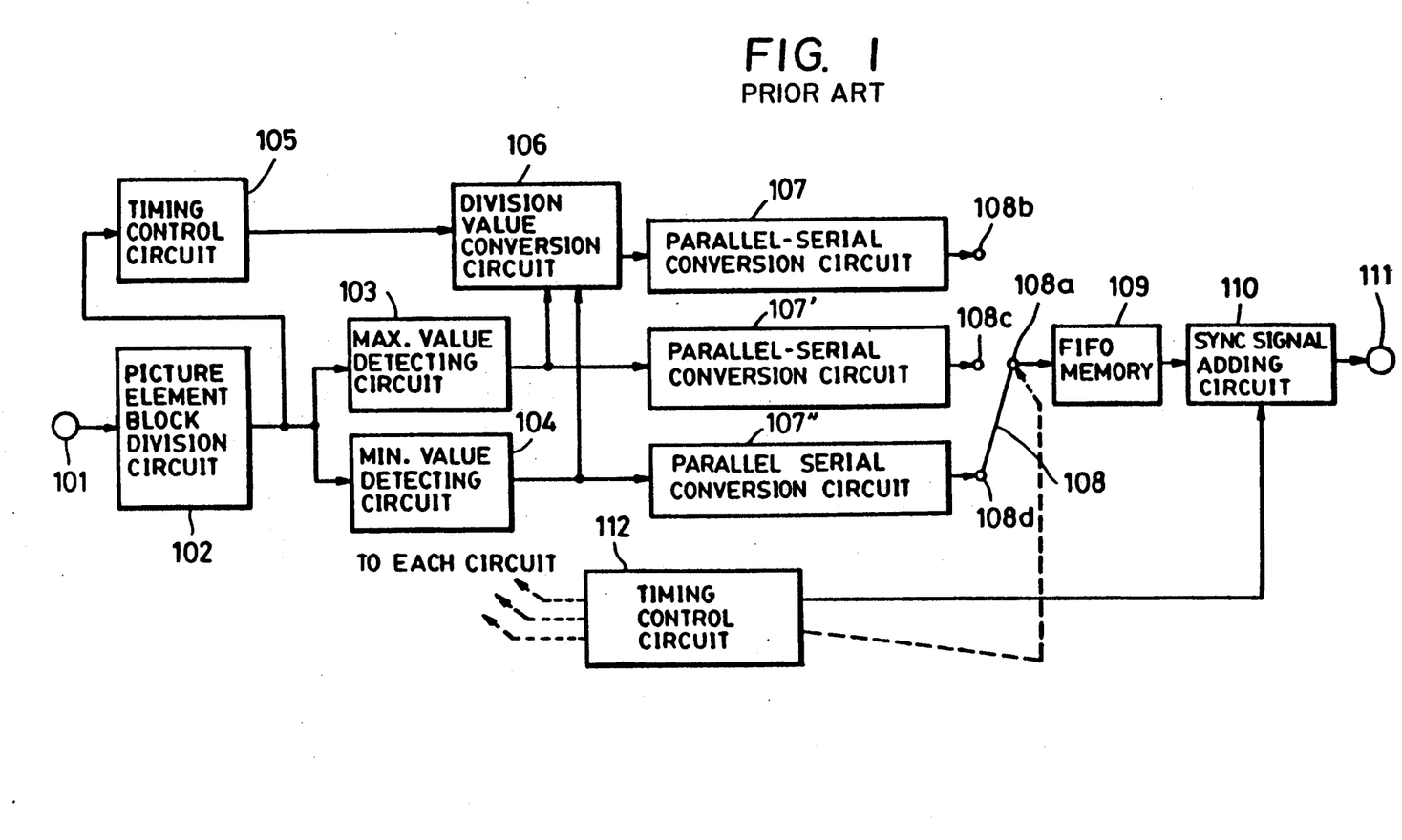
FIG. 1 is a block diagram schematically showing the construction of the signal-transmission side of a known image information transmission system.

FIG. 1 is a schematic block diagram of a known system for transmitting image information. The image information transmission system has an input terminal 101 which receives digital image data obtained through sampling, at a predetermined frequency, a raster-scan analog image signal such as a television signal and digitizing the sample data such that each sample comprises n bits. Thus, the input digital image data has a gradation represented by $2^n$. The input data is delivered first to a picture element block division circuit 102 which is capable of dividing the data carried by all picture elements on the whole picture frame into a plurality of blocks.

Figure 2:
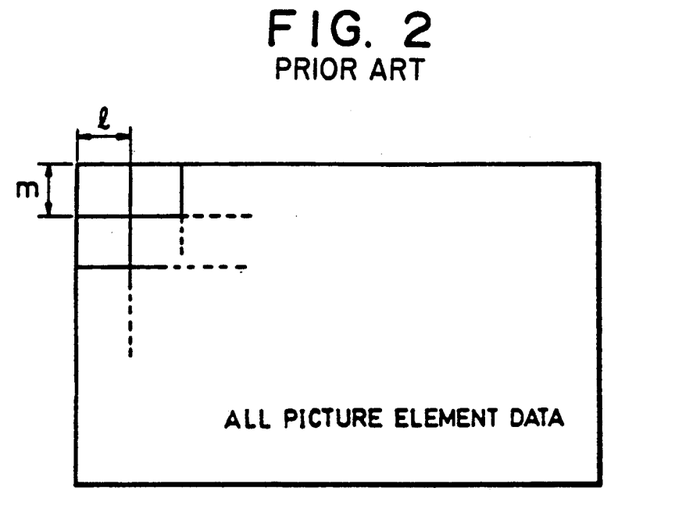
FIG. 2 is an illustration of a manner in which whole image data is divided into a plurality of picture element block data.

The division of the picture element data on the whole picture frame into blocks is conducted in a manner which will be explained with reference to FIG. 2. The picture element block division circuit 102 has a memory or an equivalent means which temporarily stores the image data carried by all the picture elements on a picture frame. The circuit 102 then divides the stored data into a plurality of blocks each having l picture elements in the horizontal direction (referred to as the "H" direction) and m picture elements in the vertical direction (referred to as the "V" direction), i.e., (l×m) blocks in total, and reads the picture element data on block basis, i.e., in a block-by-block fashion.

Figure 3:
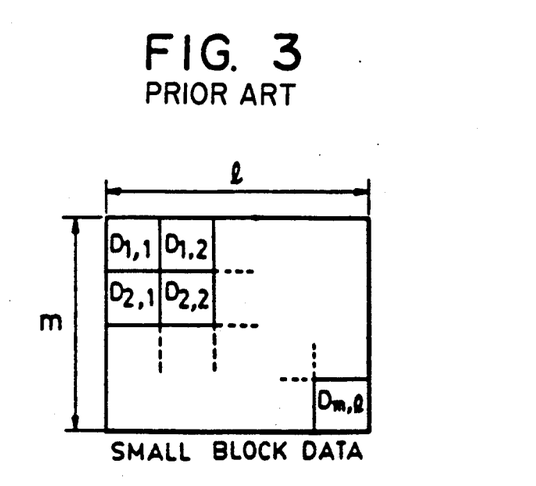
FIG. 3 is an illustration of arrangement of picture element data in each picture element block.

FIG. 3 illustrates the construction of each picture element block. It will be seen that each block contains picture elements 1.1 to m.l which carry data $D_{l.1}$ to $D_{m.l}$.

The image data output from the picture element block division circuit 102 is delivered to a maximum value detecting circuit 103, a minimum value detecting circuit 104 and a timing control section 105. In consequence, the data Dmax and Dmin having the maximum and minimum values are detected by the maximum value detecting circuit 103 and the minimum value detecting circuit 104, respectively. The timing control circuit 105 has the function of delaying the whole picture element data by a period which is long enough to enable the data Dmax and Dmin having the maximum and minimum values to be detected, and delivers the picture element data of each picture element block to a division value conversion circuit 106 in a predetermined sequence. For instance, picture element data are transmitted from the successive picture elements of each group in a sequence which is expressed as $D_{l.1}$, $D_{2.1}$, $D_{3.1}$, ..., $D_{m.1}$, $D_{l.2}$, ..., $D_{m.2}$, ..., $D_{l.(l-1)}$, ..., $D_{m.(l-1)}$, $D_{l.l}$..., $D_{m.l}$. Thus, the division value conversion circuit 106 receives the picture element data $D_{l.1}$ to $D_{m.l}$) carried by all the picture elements in each picture element block, as well as the maximum and minimum values $D_{max}$ and $D_{min}$ from among these data. The division value conversion circuit 106 compares each picture element data with quantized levels which are obtained by dividing the difference between the maximum and minimum data Dmax and Dmin by $2^k$ (k represents an integer smaller than n), whereby k-bit division codes $(\Delta_{1.1} - \Delta_{m.l})$ are obtained. The quantization is conducted in a manner which will be described with reference to FIG. 4(a).

Figure 4A:
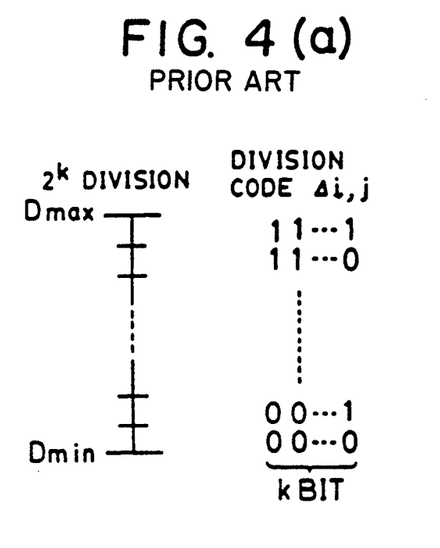
FIG. 4(a) is an illustration of conversion characteristic of a dividing value conversion circuit which is included in the circuit shown in FIG. 1.
Figure 5:
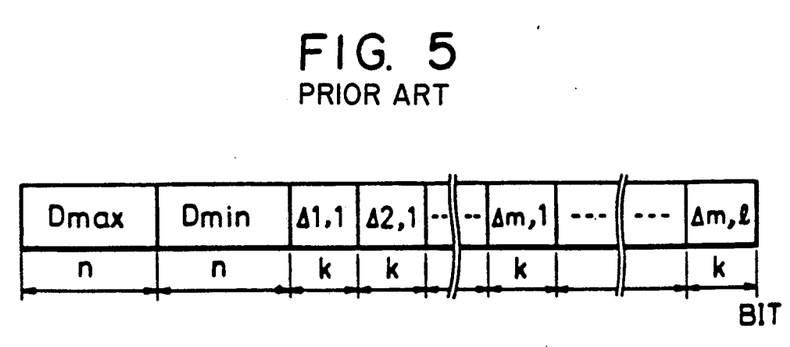
FIG. 5 is an illustration of the construction of transmitted data.

As will be seen from FIG. 4(a), the division codes $\Delta_{i,j}$ are output in the form of k-bit binary codes. The k-bit division codes $\Delta_{i,j}$ and n-bit data Dmax and Dmin are respectively converted into serial data by parallel-serial (P-S) conversion circuit 107, 107' and 107''. These serial data are then formed into serial data as shown in FIG. 5 by means of the data selector 108. It will be understood that the serial data shown in FIG. 5 corresponds to one picture element block.

The data output from the data selector 108 is input to a first-in first-out memory (FiFo memory) 109 which conducts time-axis processing on the input data so as to provide a constant data transmission rate. The output from the FiFo memory 109 is input to a sync signal adding circuit 110 so that sync signals are added to the data. The data thus provided with sync signals is then delivered through an output terminal 111 to a transmission line which leads to, for example, a magnetic recording/reproduction system of a VTR. The addition of the synchronizing signal may be conducted on each picture element block or on each group of a predetermined number of picture element blocks. The timing of operation of each element of the circuit is determined in accordance with a timing signal which is output from a timing control circuit 112.

Figure 6:
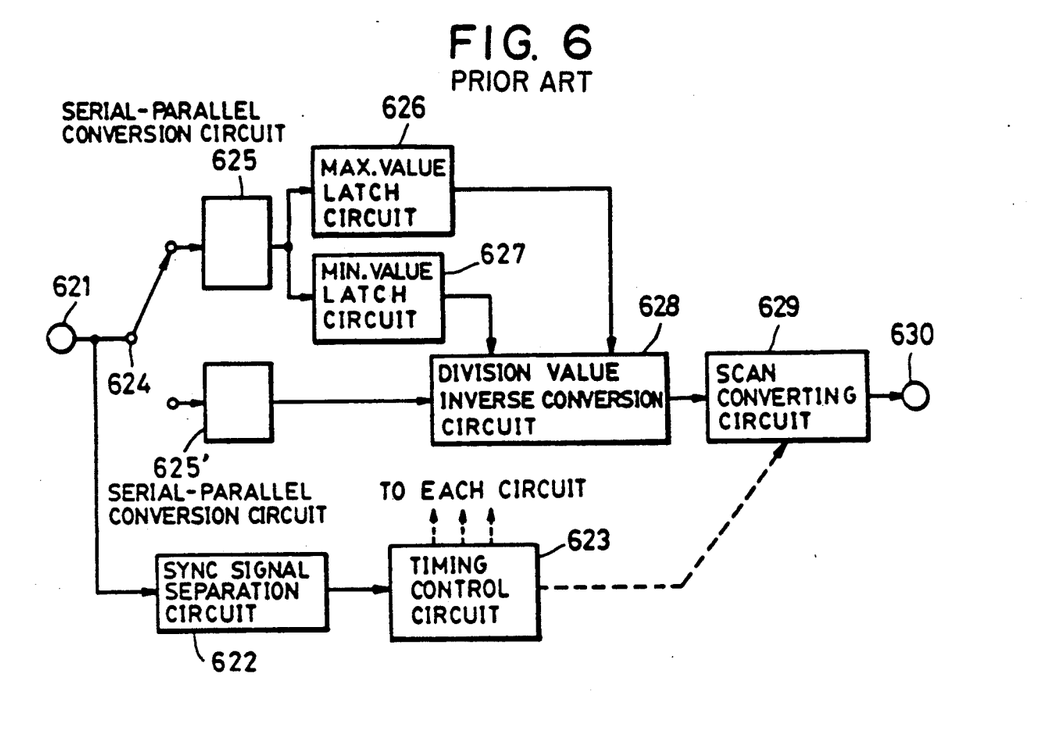
FIG. 6 is a block diagram schematically showing the construction of the signal-receiving side which is used in combination with the signal-transmission side shown in FIG. 1.

FIG. 6 is a block diagram which schematically shows the construction of a circuit which receives the data signal from the signal transmission end having the construction shown in FIG. 1. The circuit includes an input terminal 621 which receives the data which has been coded at high efficiency as explained before in connection with FIG. 1. The synchronizing signal included in the transmission data is separated by a sync signal separation circuit 622 and is delivered to a timing control circuit 623. The timing control section determines, in accordance with the separated sync signal, the timing of operation of each element of the circuit of FIG. 6.

The circuit also includes a data selector 624 which divides the transmitted data into n-bit data Dmax, Dmin and the codes $\Delta_{i,j}$ which have been obtained by quantizing the respective picture element data into k-bit codes between the maximum and minimum data Dmax and Dmin. These data are converted into parallel data through S-P (serial to parallel) conversion circuit 625 and 625'. The maximum and minimum data Dmax and Dmin among the picture element data in each picture element block, converted into parallel form through the S-P conversion circuit 625, are latched by latch circuits 626 and 627, respectively, and the thus latched data are transmitted to a division value inverse conversion circuit 628. On the other hand, the division codes $\Delta_{i,j}$ relating to the respective picture element data in each picture element block are output from the S-P conversion circuit 625' in a predetermined sequence as explained before and are supplied to the division value inverse conversion circuit 628.

Figure 4B:
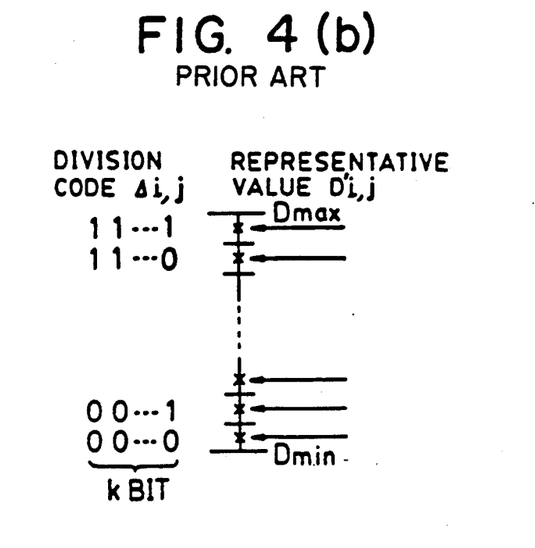
FIG. 4(b) is an illustration of conversion characteristic of a division value inverse conversion section included in a circuit shown in FIG. 6.

FIG. 4(b) shows the manner in which the representative value data $D'_{i,j}$ relating to the original picture element data are decoded from the division codes $_{i,j}$ and the maximum and minimum data Dmax and Dmin. As illustrated, the representative values are set at levels intermediate between adjacent quantized levels obtained by dividing the difference between the maximum and minimum data Dmax and Dmin by $2^k$. The n-bit representative data $(D'_{l,l}-D'_{m,l})$ thus derived from the division value inverse conversion circuit 628 are output in the aforementioned sequence in block-by-block fashion. The output data from the division value inverse conversion circuit 628 is input to a scan conversion circuit 629 which changes the sequence of the output data to a sequence corresponding to raster scan, whereby decoded image data is obtained and output through the output terminal 630.

The described apparatus makes use of only two-dimensional space correlation of the image. Therefore, certain levels of redundancy on the time axis are inevitably caused during the transmission of image information, particularly when a still image or an image which is substantially motionless is transmitted. Namely, data which are substantially the same are repeatedly transmitted with the result that the transmission efficiency is undesirably decreased.

SUMMARY OF THE INVENTION

Accordingly, an object of the present invention is to provide an image information transmission method and apparatus which overcome the above-described problems of the prior art.

Another object of the present invention is to provide image information transmission method which enables image information to be transmitted at a high transmission efficiency and with a high quality of the image.

To these ends, according to one aspect of the present invention, there is provided an image information transmission method for transmitting video information composed of a plurality of picture element data carried by a plurality of picture elements of a frame, comprising: a first step of dividing the video information of the frame into a plurality of picture element blocks each including a predetermined number of picture element data carried by a predetermined number of picture elements; a second step of forming, for each of the picture element blocks and by making use of the predetermined number of picture element data constituting each picture element block, a plurality of distribution data which are distinguishable from each other and each of which represents the distribution of levels of the predetermined number of picture element data, and forming also a plurality of position data which represent the levels of the picture element data with respect to the plurality of distribution data, the plurality of distribution data and the plurality of position data forming a unit data block for each of the picture element blocks; a third step of serially transmitting the unit data blocks of the successive picture element blocks in a predetermined sequence of picture element blocks, while varying the sequence of transmission of the plurality of distribution data in each unit data block in accordance with a predetermined information; a fourth step of receiving the serial data transmitted in the third step and restoring the predetermined information in accordance with the sequence of transmission of the plurality of distribution data; and a fifth step of receiving the unit data blocks transmitted in the third step and restoring the picture element data carried by picture elements of each of successive picture element blocks in accordance with the plurality of distribution data and the plurality of position data.

Still another object of the present invention is to provide an image information transmission apparatus which is capable of transmitting image information at a high efficiency and with a high quality of image together with other types of information.

To this end, according to another aspect of the present invention, there is provided an image information transmission apparatus for transmitting image information composed of a plurality of picture element data carried by a plurality of picture elements of a frame, comprising: dividing means for dividing the image information of the frame into a plurality of picture element blocks each including a predetermined number of picture element data carried by a predetermined number of picture elements; distribution data forming means for forming, for each of the picture element blocks and by making use of the predetermined number of picture element data constituting each picture element block, a plurality of distribution data which are distinguishable from each other and each of which represents the distribution of levels of the predetermined number of picture element data; position data forming means for forming a plurality of position data which represent the levels of the picture element data of the picture element block with respect to the plurality of distribution data, the plurality of distribution data and the plurality of position data forming a unit data block for each of the picture element block; and output means for serially transmitting the unit data blocks of the successive picture element blocks in a predetermined sequence of picture element blocks, while varying the sequence of transmission of the plurality of distribution data in each unit data block in accordance with a predetermined information.

A further object of the present invention is to provide an image information restoration system which is capable of exactly restoring image information of a high image quality and other types of information transmitted thereto.

To this end, according to still another aspect of the present invention, there is provided an image information restoring apparatus for receiving image information signals and restoring a plurality of picture element data corresponding to the image information signals, comprising: picture element data restoring means capable of receiving the image information signals which comprise a plurality of unit data blocks each being composed of a plurality of distribution data and a plurality of position data, the distribution data and the position data being arranged serially to form the unit data block, the plurality of distribution data being distinguishable from each other and representing the distribution of levels of a predetermined number of picture element data, the position data representing the levels of the picture element data in terms of position in the distribution, the picture element data restoring means being also capable of restoring the predetermined number of picture element data corresponding to each of the unit data blocks by making use of the plurality of distribution data and the plurality of position data of each unit block data; and judging means for judging the sequence of the plurality of distribution data in each unit data block of the image information signals.

These and other objects, features and advantages of the present invention will become more clear from the following description of the preferred embodiments taken in conjunction with the accompanying drawings.

BRIEF DESCRIPTION OF THE PREFERRED EMBODIMENTS

DESCRIPTION OF THE PREFERRED EMBODIMENTS

Preferred embodiments of the present invention will be described with reference to FIGS. 7 and 8 which show, respectively, the signal transmission side and the signal receiving side of an image information transmission system embodying the present invention.

Figure 7:
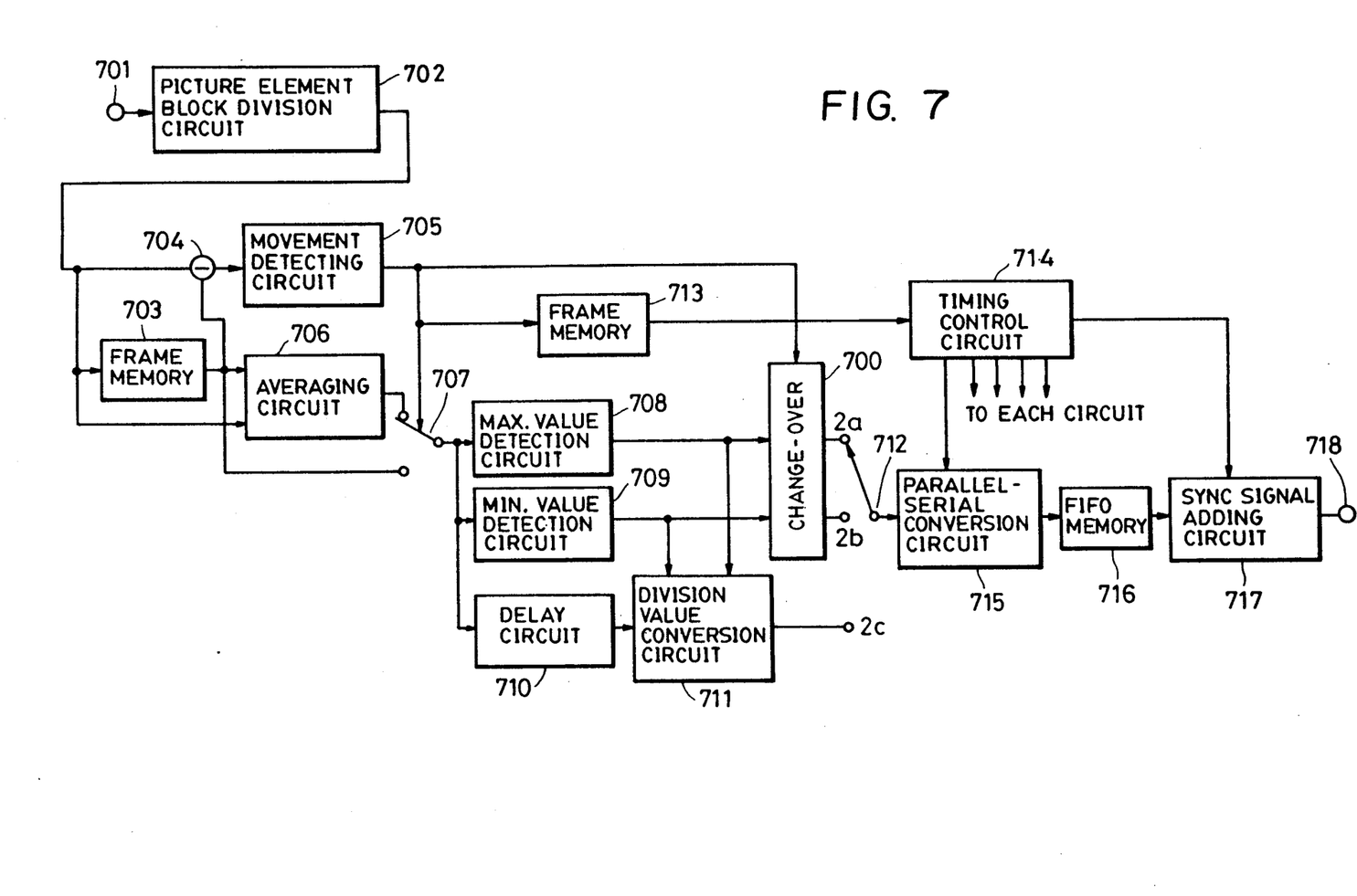
FIG. 7 is a block diagram schematically showing the construction of a signal transmission circuit of a signal transmission system embodying the present invention.

Referring first to FIG. 7, the signal transmission side of the image information transmission system has an input terminal 701 which is connected to a picture element block division circuit 702. A frame memory 703 is capable of delaying the output of the frame memory by an amount corresponding to one picture frame. Reference numeral 704 denotes a subtractor for determining the difference between the output from the picture element block division circuit 702 and the output of the frame memory 703, while 705 designates a movement detecting circuit capable of detecting, from the output of the subtractor 704, any movement of the image to be transmitted. An averaging circuit 706 is capable of determining the mean of the output of the picture element block division circuit 702 and the output of the frame memory 703. A change-over switch 707 is capable of selectively passing the output of the averaging circuit 706 and the output of the frame memory 703. The output of the change-over switch 707 is connected to a maximum value detection circuit 708 and a minimum value detection circuit 709 which are capable of detecting, respectively, the maximum value and the minimum value of the output from the change-over switch 707. Reference numeral 710 denotes a delay circuit for delaying the output from the change-over switch 707, while numeral 711 designates a division value conversion circuit designed for converting the output from the delay circuit 710 in accordance with maximum and minimum value data derived from the maximum value detection circuit 708 and the minimum value detection circuit 709. A change-over circuit 700 selectively delivers the output from one of the maximum value 708 and the minimum value detection circuit 709 in accordance with the data from the movement detecting circuit 705. A change-over switch 712 is adapted to be switched between a state in which it is connected to a terminal 2a of the change-over circuit 700 and a state in which it is connected to a terminal 2b of the same, thus conducting selection between the output from the maximum value detection circuit 708 and the output from the minimum value detection circuit 709. Reference numeral 713 designates a frame memory capable of storing data derived from the movement detecting circuit 705. A numeral 714 denotes a timing control circuit designed for controlling the timing of operation of each element of this system. A parallel-to-serial (P-S) conversion circuit 715 is capable of converting the parallel data from the change-over switch 712 into serial data. The serial data derived from the P-S conversion circuit 715 is delivered to a first-in first-out memory (FiFo memory) 716. A sync signal adding synchronization circuit 717 adds sync signals to the signal derived from the FiFo memory 716. The data now including the sync signals are delivered through an output terminal 718.

Figure 8:
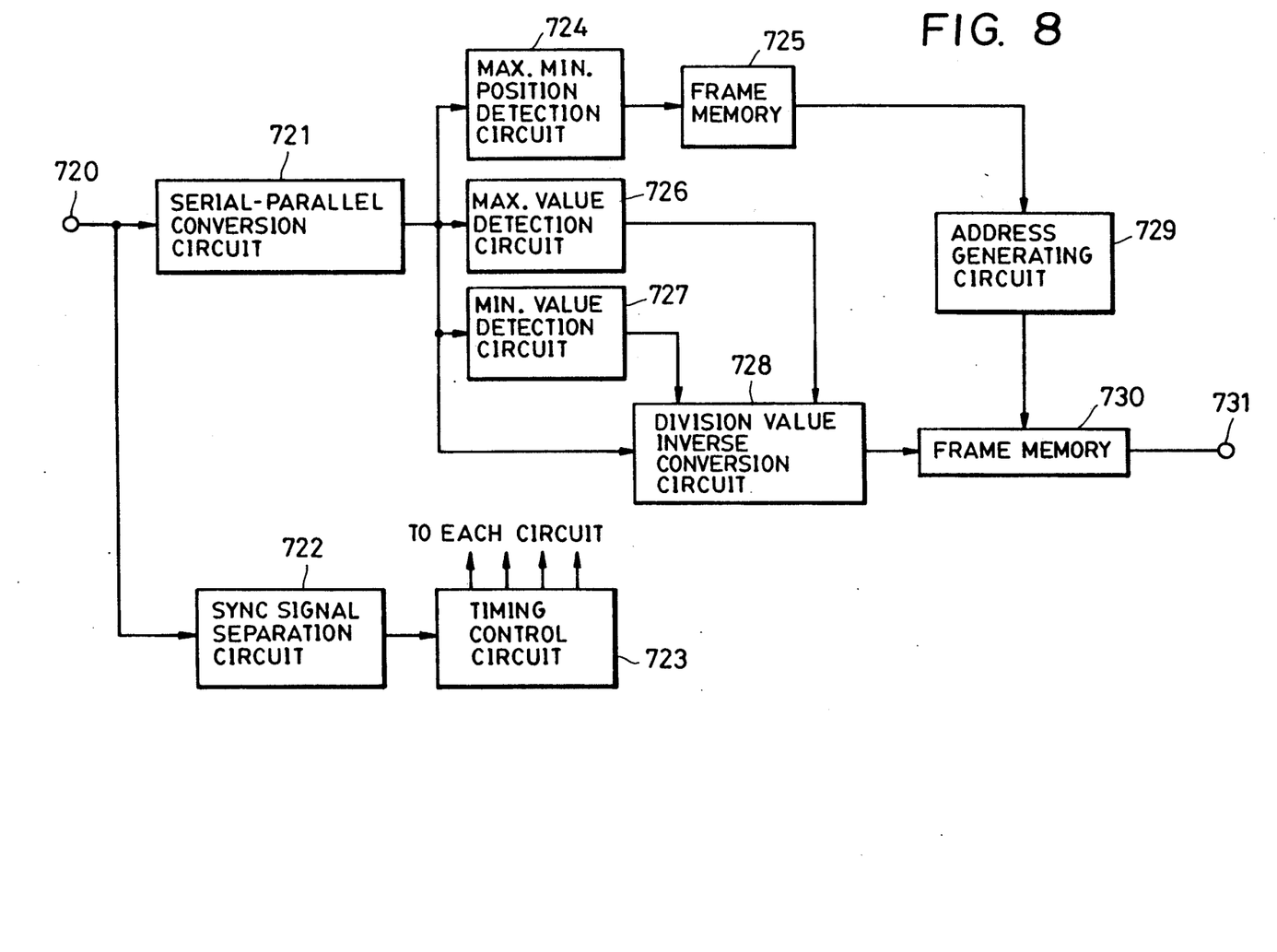
FIG. 8 is a block diagram schematically showing the construction of a signal receiving circuit in the signal transmission system incorporating the signal transmission circuit of FIG. 7.

Referring now to FIG. 8, the signal receiving side of the signal transmission system has a signal-receiving input terminal 720 which is connected both to a serial-to-parallel (S-P) conversion circuit capable of converting serial data into parallel data and a sync signal separation circuit 722 capable of separating sync signals from the input signal received by the input terminal 720. A timing control circuit 723 is capable of controlling the timing of operation of each element of the circuit in accordance with the signal derived from the synch signal separation circuit 722. Reference numeral 724 denotes a maximum/minimum position detection circuit which is capable of picking up movement information from the data derived from the S-P conversion circuit 721. The output from the maximum/minimum position detection circuit 724 is stored in a frame memory 725. A maximum value detection circuit 726 and a minimum value detector 727 are designed for detecting the maximum value and the minimum value from the output derived from the S-P conversion circuit 721. A division value inverse conversion circuit 728 is capable of conducting inverse conversion of the signal from the S-P conversion circuit 721 in accordance with the data derived from the detection circuits 726 and 727. An address generating circuit 729 is capable of generating address data concerning address in the frame memory 730 in accordance with data output from the frame memory 725. The output from the frame memory 730 is delivered through an output terminal 731.

The operation of each element of the system will be explained in accordance with the flow of the signal through the system. Referring back to FIG. 7, the input terminal 701 receives n-bit digital image data which has been obtained through sampling, at a predetermined frequency, a raster-scanned analog image signal such as a television signal and digitizing the sampled signal. The input signal thus having a gradation represented by $2^n$ is delivered to the picture element block division circuit 702 which serves to divide the picture elements on one frame into a plurality of blocks each containing (1×m) picture elements, i.e., picture elements in the horizontal direction and m picture elements in the vertical direction. Thus, the data is output in block-by-block fashion.

The image data output from the picture element block division circuit 702 is delivered to the frame memory 703, subtractor 704 and the averaging circuit 706. The frame memory 703 serves to cause the data to be delayed by a time corresponding to one frame and delivers the thus delayed data to the subtractor 704 and the averaging circuit 706. The subtractor 704 determines the difference between the data of the immediately preceding frame and the present frame so as to determine the time axis space correlation, whereby the movement detecting circuit 705 produces information concerning the movement of the image.

The movement detecting circuit 705 compares the difference between the data of the successive frames with a preset threshold and outputs 1-bit movement information indicative of whether any detected movement exceeds the threshold. The movement detecting circuit 705 also determines which one of the mean value (output of the averaging circuit 706) of the data of two frames and the original data (output from the frame memory 703) which has been delayed by amount corresponding to one frame is to be coded and transmitted. This selecting operation is performed by the change-over switch 707.

Figure 9:
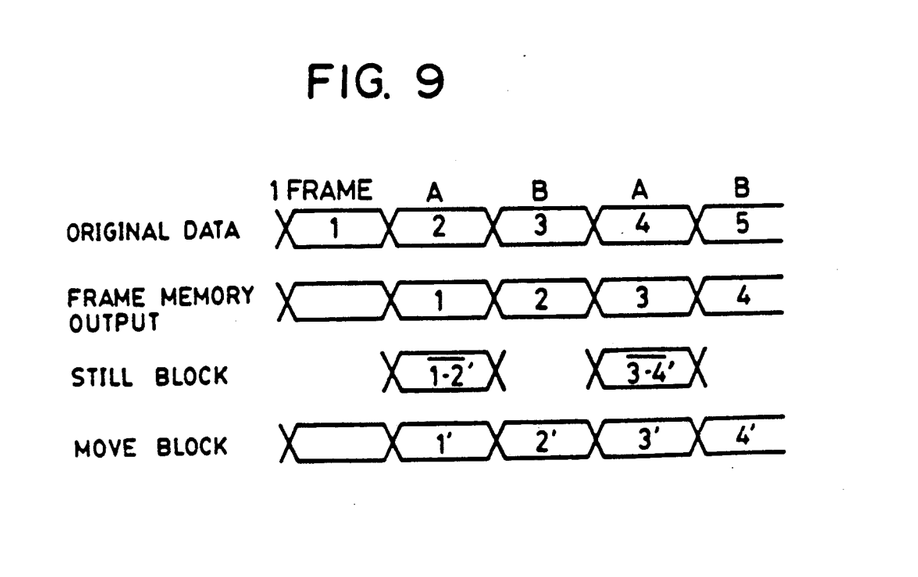
FIG. 9 is an illustration explanatory of the operation of the circuits shown in FIGS. 1 and 2.

Coded transmission information having a structure as shown in FIG. 9 is output on the basis of the movement information derived from the movement detecting circuit 705. Thus, transmission of information is conducted for the successive frames. The output from the frame memory, concerning a block which shows a movement, is coded in accordance with the MIN-MAX method. In the case of a block which carries still image information, the mean value (1·2) of the original data and the data of the immediately preceding data is coded by the MIN-MAX method and data corresponding to one frame is transmitted for every two frames.

More specifically, when an image portion corresponding to a block has been judged to have any movement, the output from the frame memory 703 is delivered through the change-over switch 707 to the maximum value detection circuit 708, minimum value detection circuit 709 and the delay circuit 710. In consequence, the data Dmax having the maximum value and the data Dmin having the minimum value are detected from among all the picture element data $(D_{l.1} - D_{m.l})$ of each block by the maximum value detection circuit 708 and the minimum value detection circuit 709, respectively, and the thus detected maximum and minimum data Dmax and Dmin are delivered to the change-over circuit 700.

The change-over circuit 700 selectively delivers one of the output from the maximum value detection circuit 708 and the output from the minimum value detection circuit 709 in accordance with the information derived from the movement detecting circuit 705. For instance, when a certain block has been judged by the movement detecting circuit as having a "movement", in the illustrated embodiment by exceeding the threshold, the change-over circuit 712 outputs the data Dmax derived from the maximum value detection circuit 708 through the output terminal 2a and also outputs the data Dmin derived from the minimum value detection circuit 709 from the output terminal 2b thereof. Conversely, when the block has been judged as being "still", the data Dmax and Dmin appear, respectively, at the output terminals 2b and 2a of the change-over circuit 700.

On the other hand, the delay circuit 710 operates to delay the whole picture element data by a time which is necessary for the maximum value detection circuit 708 and the minimum value detection circuit 709 to conduct their processings, and transmits the picture element data of each picture element block to the division value conversion circuit 711 in a predetermined sequence. For instance, picture element data are transmitted in a sequence expressed by $D_{l.1}, D_{2.1}, D_{3.1}, ...., D_{m.1}, D_{l.2}, ...., D_{l(l-1)}, ..., D_{m.(l-1)}, D_{l.l}, ..., D_{m.l}$.

Thus, the picture element data $(D_{l.1} - D_{m.l})$ carried by all the picture elements in each picture element block, together with the maximum value Dmax and the minimum value Dmin of these data, are input to the division value conversion circuit 711. The conversion circuit 711 compares each picture element data with quantizing levels obtained by dividing the difference between the maximum and minimum values Dmax and Dmin by $2^k$ (k being an integer), whereby k-bit division codes $(\Delta_{1.1} - \Delta_{m.l})$ are produced.

The k-bit division codes thus obtained are delivered together with the n-bit data Dmax and Dmin are supplied to the change-over switch 712.

The change-over switch 712 has the function of selecting data in accordance with the sequence of transmission of the data to be transmitted. The change-over device 700 and the change-over switch 712 function to provide a data sequence expressed by Dmax, Dmin, $\Delta_{1.1}, ...., \Delta_m$ for a block which contains any movement and a data sequence expressed by Dmin, Dmax, $\Delta_{1.1}, ...., \Delta_{m.l}$ for a block which is still. Namely, the sequence of transmission of the data Dmax and Dmin is reversed depending on whether the block contains any movement.

In consequence, data are output from the change-over switch 712 in a sequentially switched manner. These output data are converted into serial data through the P-S converter 715.

The first-in first-out memory (FiFo memory) 716 conducts a time-axis processing on the data derived from the change-over switch 712 so as to provide a constant data transmission rate, and sync signals are added to the thus processed data by the sync signal adding circuit 717. The data now having the synchronizing signals is output from the output terminal 718 to a transmission line which leads, for example, to a magnetic recording/reproduction system of a VTR or the like device. The addition of the sync signals may be conducted for each picture element block or for each of a plurality of block groups each having a plurality of blocks. The timings of operations of the respective elements of the circuit shown in FIG. 7 are determined in accordance with the timing signals output from the timing control circuit 714.

When a block has been judged as being "still", the following operation is performed.

During the transmission of the data of a frame "A" shown in FIG. 9, the change-over switch 707 selects the output from the averaging circuit 706 and the signal processing operation is executed in the same manner as that described before. At the same time, the movement information derived from the movement detecting circuit 705 is stored in the frame memory 713. The capacity of the frame memory 713 may be (1×m×1) bits, i.e., one bit for each picture element of the picture element block.

In the case of a frame "B" in FIG. 9, transmission of image data is not conducted so that the compression is enhanced.

Whether the data transmission is to be conducted during the period of the frame "B" is determined in accordance with the information which relates to the movement of each block as judged in regard to the preceding frame "A" and which has been stored in the frame memory 713.

A description will be made of the operation of the circuit shown in FIG. 8. The input terminal 720 of this circuit receives the image information data signal transmitted from the circuit shown in FIG. 7. The thus received signal is delivered to the S-P conversion circuit 721 and the sync signal separation circuit 722. The sync signal separation circuit 722 detects and separates the sync signals included in the data which has been transmitted from the circuit of FIG. 7 and delivers the separated sync signals to the timing control circuit 723 which determines the timings of operation of the respective elements in the signal-receiving circuit shown in FIG. 8.

Meanwhile, the S-P conversion circuit 721 converts the serial input data into parallel data and delivers the thus formed parallel data to the maximum/minimum position detection circuit 724, the maximum value detection circuit 726, the minimum value detector 727 and the division value inverse conversion circuit 728.

The maximum/minimum position detection circuit 724 judges the sequence of the maximum and minimum data Dmax and Dmin for each of the transmitted data of successive blocks and determines whether the block is a "moving" block or a "still" block.

The movement information data thus derived for each picture element block from the maximum/minimum position detection circuit 724 is stored in the frame memory 725. The movement information data is transmitted from the transmission side of the system only during the period of the frame "A" shown in FIG. 9 so that it is used for the receiving and reproduction of the data of the frame "B".

Upon receipt of the data Dmax and Dmin, the division value inverse conversion circuit 728 divides the difference between these data Dmax and Dmin by $2^k$ and converts the picture element data $\Delta_{1,1}, ..., \Delta_{m,l}$ from the S-P conversion circuit 721 into the values obtained through the division and outputs the values obtained through the conversion.

The frame memory 730 stores the output from the division value inverse conversion circuit 728 and converts the same in accordance with the control signal derived from the address generating circuit 729 into a sequence corresponding to the raster scan. The data after the conversion now having the sequence corresponding to raster scan is output from the output terminal 731 as decoded image data. Meanwhile, the frame memory 730 stores data on all picture elements for the frame "A". However, for the frame "B", only the data on moving blocks are stored in the frame memory 730.

The address generating circuit 729 generates writing addresses on the basis of the movement information data stored in the frame memory 725. For reading purposes, the address generating circuit 729 generates addresses such that a picture element sequence corresponding to the raster scan is obtained so that the data stored in the frame memory 730 is output through the output terminal 731 as decoded image data.

Although in the described embodiment the movement information is used as additional information, this is only illustrative and other suitable type or types of information can be combined with the image information transmitted by the apparatus in accordance with the present invention.

As will be understood from the foregoing description, the present invention enables image information to be transmitted at a high efficiency by virtue of the adaptive change of the transmission mode in accordance with the time correlation of the image information. In addition, the invention makes it possible to transmit, without requiring any specific information data, the result of judgment as to whether each picture element block belongs to a moving region or a still region of each frame. Other changes may be made without departing from the scope of the present invention, which is to be determined by reference to the appended claims.

What is claimed is:

1. An image information transmission method for transmitting image information composed of a plurality of picture element data carried by a plurality of picture elements of a frame, comprising:

(A) a first step of dividing the image information of said frame into a plurality of picture element blocks each including a predetermined number of picture element data carried by a predetermined number of picture elements;

(B) a second step of forming, for each of said picture element blocks and by making use of the predetermined number of picture element data constituting each said picture element block, a plurality of distribution data which are distinguishable from each other and each of which represents a distribution of levels of said predetermined number of picture element data, and forming also a plurality of position data which represent the levels of said picture element data with respect to said plurality of distribution data, said plurality of distribution data and said plurality of position data forming a unit data block for each of said picture element blocks;

(C) a third step of serially transmitting said unit data blocks of successive picture element blocks in a predetermined sequence of picture element blocks, while deciding the sequence of transmission of said plurality of distribution data in each unit data block in accordance with a predetermined information;

(D) a fourth step of receiving the serial data transmitted in said third step and restoring said predetermined information in accordance with the sequence of transmission of said plurality of distribution data; and (E) a fifth step of receiving said unit data blocks transmitted in said third step and restoring the picture element data carried by picture elements of each of successive picture element blocks in accordance with the plurality of distribution data and the plurality of position data.

2. A method according to claim 1, wherein said plurality of distribution data includes maximum value data having the maximum value among said predetermined number of picture element data and minimum value data having the minimum value among said predetermined number of picture elements.

3. A method according to claim 2, wherein said second step includes:
quantizing a dynamic range of levels of said predetermined number of picture element data determined by said maximum value data and said minimum value data thereby dividing said dynamic range into a plurality of level ranges;
setting a plurality of level range indicating data which correspond to positions of said level ranges in said dynamic range; and
representing, in terms of said level range indicating data, the level ranges to which the levels of said picture element data belong, thus forming a plurality of level range indicating data as said plurality of position data.

4. A method according to claim 2, wherein said third step is arranged to decide the sequence of the serial transmission of said maximum value data and said minimum value data in accordance with said predetermined information.

5. A method according to claim 4, wherein said fourth step is arranged to restore binary-coded information in accordance with the sequence of transmission of said maximum value data and said minimum value data in the received unit data block.

6. A method according to claim 3, wherein said fifth step is arranged to restore each picture element data of said picture element block by utilizing, as the picture element data, representative value data of the level ranges indicated by said plurality of level range data indicative of range levels of the dynamic range of the predetermined number of picture element data of each picture element block as determined by said maximum value data and said minimum value data in said unit data block.

7. A method according to claim 1, wherein said second step includes:
(A) a sixth step of receiving said predetermined number of picture element data for each of said picture element blocks determined in said first step on a present frame, and computing and delivering mean value data of the received predetermined number of picture element data of each picture element block and those of the corresponding picture element block determined on a preceding frame;
(B) a seventh step of determining whether any movement of image exists in each of said picture element blocks;
(C) an eighth step of delivering said predetermined number of picture element data of said picture element block when said picture element block has been determined to have a movement in said seventh step and delivering a predetermined number of mean value data computed in said sixth step for said picture element block when said picture element block has been determined to have no movement; and
(D) a ninth step of detecting, as said plurality of distribution data, maximum value data and minimum value data from the ones of said predetermined number of picture element data and predetermined number of mean value data which are delivered in said eighth step, quantizing a dynamic range of levels of said picture element data or said mean value data determined by said maximum value data and said minimum value data so as to divide said dynamic range into a plurality of level ranges, setting a plurality of level range indicating data corresponding to positions of said level ranges of said dynamic range, indicating, by means of said level range indicating data, the level ranges to which the levels of said picture element data belong, and outputting the plurality of level range indicating data corresponding to said plurality of said picture element data.

8. A method according to claim 7, wherein said third step is arranged to vary the sequence of transmission of said maximum value data and said minimum value data depending on whether the movement is detected in said seventh step.

9. A method according to claim 8, wherein said fourth step is arranged to restore movement information concerning the movement of each picture element block, in accordance with the sequence of transmission of said maximum value data and said minimum value data in said unit data block corresponding to said picture element block.

10. A method according to claim 9, wherein said fifth step is arranged such that, when movement exists in the picture element block corresponding to a unit data block transmitted in said fourth step, the picture element data in said picture element block are restored by utilizing, as the picture element data, the representative value data of level ranges indicated by said plurality of level range indicating data in said dynamic range of levels of said predetermined number of picture element data determined by the maximum value data and the minimum value data in said unit data block, and such that, when no movement exists in a picture element block, the picture element data in said picture element block are restored by using the picture element data of the corresponding picture element block of the immediately preceding frame.

11. An image information transmission apparatus for transmitting image information composed of a plurality of picture element data carried by a plurality of picture elements of a frame, comprising:
(A) dividing means for dividing the image information of said frame into a plurality of picture element blocks each including a predetermined number of picture element data carried by a predetermined number of picture elements;
(B) distribution data forming means for forming, for each of said picture element blocks and by making use of the predetermined number of picture element data constituting each said picture element block, a plurality of distribution data which are distinguishable from each other and each of which represents a distribution of levels of said predetermined number of picture element data;
(C) position data forming means for forming a plurality of position data which represent the levels of said picture element data of said picture element block with respect to said plurality of distribution data, said plurality of distribution data and said plurality of position data forming a unit data block for each of said picture element blocks; and (D) output means for serially transmitting said unit data blocks of successive picture element blocks in a predetermined sequence of picture element blocks, while deciding the sequence of transmission of said plurality of distribution data in each unit data block in accordance with a predetermined information.

12. An apparatus according to claim 11, wherein said distribution data forming means includes:
(a) maximum value data detecting means for detecting and delivering the data having the maximum value among said picture element data constituting each of said picture element blocks determined by said dividing means; and
(b) minimum value data detecting means for detecting and delivering the data having the minimum value among said picture element data constituting each of said picture element blocks determined by said dividing means.

13. An apparatus according to claim 12, wherein said position data forming means includes level range indicating data forming means having: means for receiving said maximum value data and said minimum value data delivered by said maximum value data detecting means and said minimum value detecting means; means for quantizing a dynamic range of levels of said predetermined number of picture element data determined by said maximum value data and said minimum value data thereby dividing said dynamic range into a plurality of level ranges; means for setting a plurality of level range indicating data which correspond to positions of said level ranges in said dynamic range; means for representing, in terms of said level range indicating data, the level ranges to which the levels of said picture element data belong, thus forming a plurality of level range indicating data; and means for delivering said plurality of level range indicating data as said plurality of position data.

14. An apparatus according to claim 12, wherein said output means decides the sequence of serial transmission of said maximum value data and said minimum value data in accordance with said predetermined information.

15. An apparatus according to claim 11, wherein said distribution data forming means includes:
(a) picture element data holding means capable of temporarily holding picture element data of each of said picture element blocks of a frame upon receipt of said picture element data of said picture element blocks determined by said dividing means;
(b) mean value computing means for computing, upon receipt of the predetermined number of picture element data of each of said picture element blocks, the mean values of the received picture element data of each picture element block and the picture element data of the corresponding block of a preceding frame held by said picture element data holding means;
(c) movement detection means for computing, upon receipt of the predetermined number of picture element data of each of said picture element blocks, the difference between the values of the received picture element data of each picture element block and the picture element data of the corresponding block of the preceding frame held by said picture element data holding means, and determining, from the level of the difference data corresponding to said difference, whether there is a movement exceeding a predetermined amount of movement in each of said picture element blocks;
(d) selective output means for outputting, when a picture element block has been determined to have a movement exceeding said predetermined amount, the picture element data of the corresponding picture element block of said preceding frame held by said picture element data holding means, and outputting, when said picture element block has been determined as having no such movement, said predetermined number of mean value data computed by said mean value computing means;
(e) maximum value data detecting means for detecting and delivering maximum value data from the ones of said predetermined number of picture element data and said predetermined number of mean value data output from said selective output means; and
(f) minimum value data detecting means for detecting and delivering minimum value data from the ones of said predetermined number of picture element data and said predetermined number of mean value data output from said selective output means.

16. An apparatus according to claim 15, wherein said position data forming means includes level range indicating data forming means having: means for receiving said maximum value data and said minimum value data delivered by said maximum value data detecting means and said minimum value detecting means; means for quantizing a dynamic range of levels of said predetermined number of picture element data determined by said maximum value data and said minimum value data thereby dividing said dynamic a plurality of level range indicating data which correspond to positions of said level ranges in said dynamic range; means for representing, in terms of said level range indicating data, the level ranges to which the levels of said picture element data belong, thus forming a plurality of level range indicating data; and means for delivering said plurality of level range indicating data as said plurality of position data.

17. An apparatus according to claim 16, wherein said output means decides the sequence of serial transmission of said maximum value data and said minimum value data depending on whether said movement exceeding said predetermined amount has been detected by said movement detecting means.

18. An image information restoring apparatus for receiving image information signals and restoring a plurality of picture element data corresponding to said image information signals, comprising:
(A) picture element data restoring means capable of receiving said image information signals which comprise a plurality of unit data blocks each being composed of a plurality of distribution data and a plurality of position data, said distribution data and said position data being arranged serially to form said unit data block, said plurality of distribution data being distinguishable from each other and representing a distribution of levels of a predetermined number of picture element data, said position data representing the levels of said picture element data in terms of position in said distribution, said picture element data restoring means being also capable of restoring a predetermined number of picture element data corresponding to each of said unit data blocks by making use of said plurality of distribution data and said plurality of position data of each unit block data; and (B) judging means for judging the sequence of said plurality of distribution data in each unit data block of said image information signals.

19. An apparatus acording to claim 18, wherein said plurality of distribution data includes maximum value data having the maximum value among said predetermined number of picture elements and minimum value data having the minimum value among said predetermined number of picture element data.

20. An apparatus according to claim 19, wherein said judging means is arranged to judge the sequence of said maximum value data and said minimum value data in said unit data block of said image information signals and to restore binary-coded information in accordance with the result of the judgment.

21. An apparatus according to claim 19, wherein a dynamic range of levels of said predetermined number of picture element data corresponding to each unit data block is determined by said maximum value data and said minimum value data and is quantized so as to be divided into a plurality of level ranges which are represented by respective level range indicating data, and wherein said plurality of position data include a plurality of said level range indicating data which indicate level ranges to which the levels of said picture element data of a picture element block corresponding to said unit data block belong.

22. An apparatus acording to claim 21, wherein said picture element data restoring means is arranged to restore said picture element data of said picture element said picture element data, the representative data of said level ranges indicated by said plurality of level range indicating data in said dynamic range of said plurality of picture element data of said picture element block corresponding to said unit data block determined by said maximum value data and said minimum value data in said unit data block of the received image information signals.

23. An apparatus according to claim 22, wherein said judging means judges the sequence of said maximum value data and said minimum value data in said unit data block in said image information signals and restores, in accordance with the result of the judgment, movement information concerning generation of movement of the picture element block corresponding to said unit data block.

24. An apparatus according to claim 23, further comprising memory means for storing said picture element data of said picture element block corresponding to each unit data block and restored by said picture element data restoring means only when said picture element block has been judged to include movement.

* * * * *

UNITED STATES PATENT AND TRADEMARK OFFICE
CERTIFICATE OF CORRECTION

PATENT NO. : 5,023,715  
DATED : June 11, 1991  
INVENTOR(S) : MITSURU OWADA, ET AL.

Page 1 of 2

It is certified that error appears in the above-identified patent and that said Letters Patent is hereby corrected as shown below:

COLUMN 1

Line 6, "No. 272.418," should read --No. 272,418,--.

COLUMN 2

Line 13, "$D_{m.1}$)" should read --$D_{m.1}$--.

COLUMN 3

Line 15, "codes $_{ij}$" should read --codes $\Delta_{ij}$--.

COLUMN 5

Line 15, "PREFERRED" should read --DRAWINGS--.  
Line 16, "EMBODIMENTS" should be deleted.

COLUMN 7

Line 49, "(1·2)" should read --$\overline{(1·2)}$--.

COLUMN 8

Line 43, "$\Delta_{m.}$" should read --$\Delta_{m.1}$--.

COLUMN 14

Line 33, "dynamic" should read --dynamic range into-- and "level range" should read --level ranges; means for setting a plurality of level range--.

UNITED STATES PATENT AND TRADEMARK OFFICE
CERTIFICATE OF CORRECTION

PATENT NO. : 5,023,715

DATED : June 11, 1991

INVENTOR(S) : MITSURU OWADA, ET AL.

It is certified that error appears in the above-identified patent and that said Letters Patent is hereby corrected as shown below:

COLUMN 15

Line 4, "acording" should read --according--.

COLUMN 16

Line 3, "acording" should read --according--.
Line 5, "element" (second occurrence) should read --element block corresponding to said unit data block by using, as--.

Signed and Sealed this

Twenty-third Day of March, 1993

Attest:

STEPHEN G. KUNIN

*Attesting Officer*    Acting Commissioner of Patents and Trademarks